United States Patent [19]

Amador et al.

[11] Patent Number: 4,729,436

[45] Date of Patent: Mar. 8, 1988

[54] BALL AND DISC OVER-SPEED SHUT-OFF MECHANISM FOR A ROTARY PNEUMATIC TOOL

[75] Inventors: German Amador; Paul A. Biek, both of Houston, Tex.

[73] Assignee: Dresser Industries, Inc., Dallas, Tex.

[21] Appl. No.: 910,115

[22] Filed: Sep. 19, 1986

[51] Int. Cl.⁴ ............................................. B23Q 5/06
[52] U.S. Cl. ...................................... 173/12; 415/25; 418/43
[58] Field of Search .............. 173/12; 81/470; 415/25; 416/48; 418/40-43; 91/59; 137/53, 57

[56] References Cited

U.S. PATENT DOCUMENTS

| | | | |
|---|---|---|---|
| 3,387,669 | 6/1968 | Wise, Jr. et al. | 173/12 |
| 3,749,530 | 7/1973 | Amador | 418/41 |
| 4,090,821 | 5/1978 | Barrows et al. | 418/43 |
| 4,298,317 | 11/1981 | Hansson | 418/43 |

*Primary Examiner*—E. R. Kazenske
*Assistant Examiner*—James L. Wolfe
*Attorney, Agent, or Firm*—Richards, Harris, Medlock & Andrews

[57] ABSTRACT

A rotary pneumatic tool includes an over-speed shut-off mechanism including a shiftable spring washer and flyweights for imparting a shifting force to the spring washer dependent on the speed of the tool. In the preferred embodiment, the spring washer is shifted by spherical balls restrained by cylindrical walls within a body affixed to the rotor in combination with the spring washer and spring members attached to the body. The spring rates of the spring washer and spring members predetermine the speed at which the over-speed mechanism becomes activated.

5 Claims, 5 Drawing Figures

BALL AND DISC OVER-SPEED SHUT-OFF MECHANISM FOR A ROTARY PNEUMATIC TOOL

TECHNICAL FIELD

This invention relates to rotary pneumatic tools, and more particularly to a shut-off mechanism for disabling a tool upon reaching an over-speed condition.

BACKGROUND ART

Speed limiting governors have long been used to prevent over-speed conditions in rotary pneumatic tools such as portable grinders. An unsafe overspeed condition occurs when the grinding wheel is rotated at a speed where inertia forces exceed the strength of the grinding wheel material causing the wheel to disintegrate.

The conventional governor used with a rotary pneumatic tool operates to control the speed of the tool in a no-load condition. Typically, a governor includes pivotable weights mounted about a body connected to the rotor of the machine and cooperating with a shiftable valve element in the compressed gas passageway to the rotor. The weights in the governor are selected to provide a maximum speed well below the speed at which a given grinding wheel will disintegrate.

It is desirable to increase safety even further by providing an over-speed shut-off mechanism in addition to a speed limiting governor. An over-speed shut-off mechanism operates in the event the speed governor malfunctions and causes an over-speed condition. The over-speed shut-off mechanism is designed to remain inactive as long as the governor operates correctly, but in the event the governor becomes incapable of keeping the speed below the safe limit, due to wear or seizure, the shut-off mechanism becomes activated and stops the tool.

The shut-off mechanism does not activate unless the governor has malfunctioned, so it is also preferable to require disassembly of the tool to reset the shut-off mechanism. The operator can then make necessary repairs to the governor as well as reset the shut-off mechanism.

SUMMARY OF THE INVENTION

The present invention provides an over-speed shut-off mechanism for a rotary pneumatic tool which includes a frusto-conical bistable spring washer. The spring washer is shiftable between being conical in one direction and conical in the opposite direction. The spring washer is fixed to the tool's rotor such that the rotor is sealed from the source of compressed gas when the washer is in one position and connected to the source of gas when the washer is in the other position. Means responsive to an overspeed condition is provided to shift the spring washer to the sealed position upon attainment of a predetermined maximum speed. The means for shifting the spring washer includes a spherical ball retained within a body by a spring member and urged outwardly by rotation of the rotor

BRIEF DESCRIPTION OF THE DRAWINGS

FIG. 5 is an exploded view illustrating the mechanism of FIG. 1

DETAILED DESCRIPTION

Figure 1:
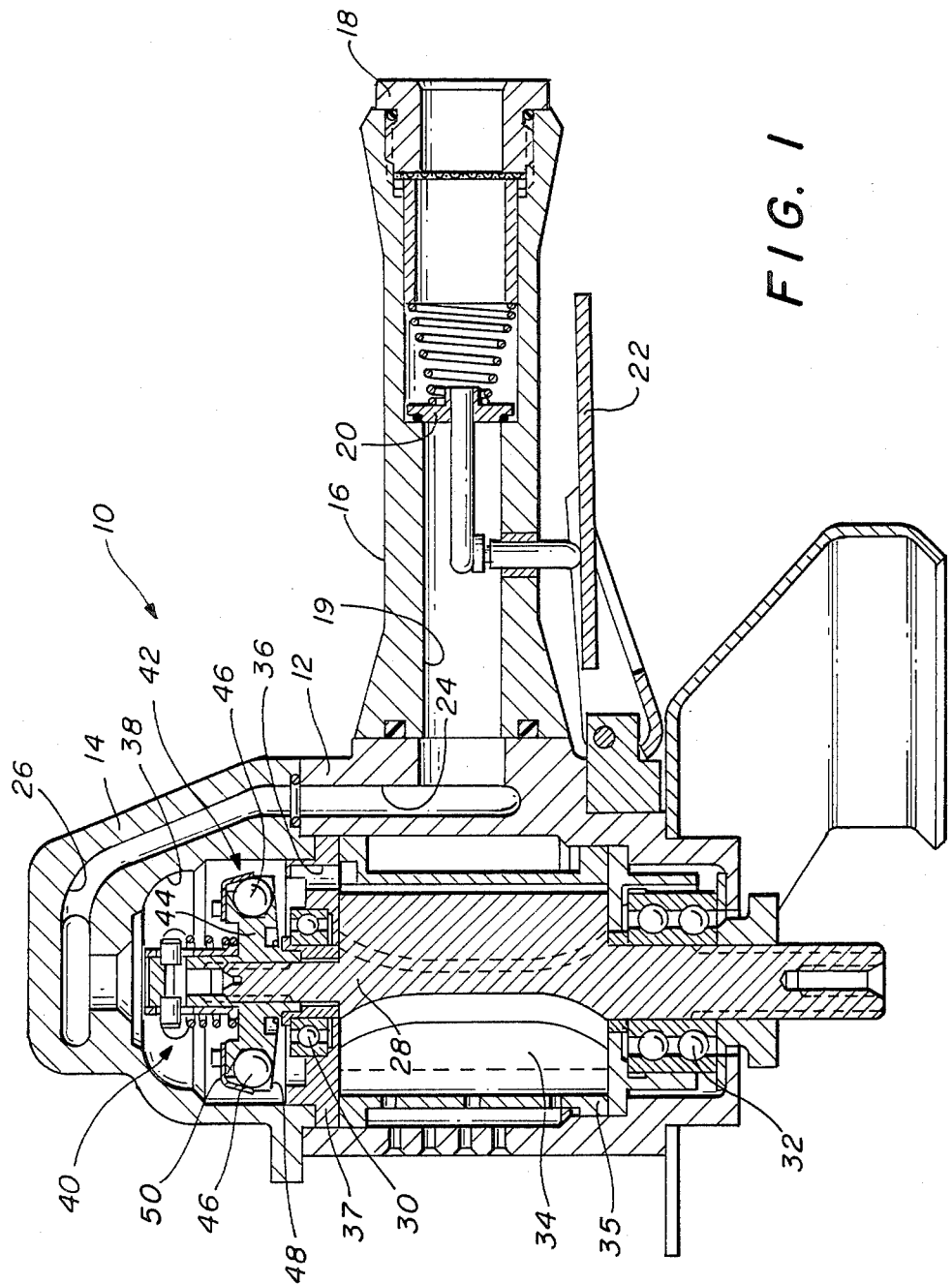
FIG. 1 is a partially broken away side view of a portable grinder incorporating the over-speed shut-off mechanism of the present invention.

Referring initially to FIG. 1, a rotary pneumatic portable grinder 10 includes housing 12, cap 14 and handle 16. Input opening 18 is provided for connection to a source of compressed gas (not shown). Passageway 19 in handle 16 extends between input opening 18 and housing 12. Valve 20 is actuatable by trigger 22 to control the flow of gas through passageway 19. Passageway 19 communicates with passageway 24 in housing 12, which in turn communicates with passageway 26 in cap 14.

Rotor 28 is mounted for rotation within housing 12 on bearings 30 and 32. Vanes 34 cooperate with rotor 28 and stator 35 to provide power for the tool. Passageway 36 is provided in member 37 between chamber 38 in cap 14 and vanes 34. Tool 10 includes a governor mechanism 40 and over-speed shut-off mechanism 42. The over-speed shut-off mechanism 42 of the preferred embodiment is integral with governor mechanism 40.

Figure 2:
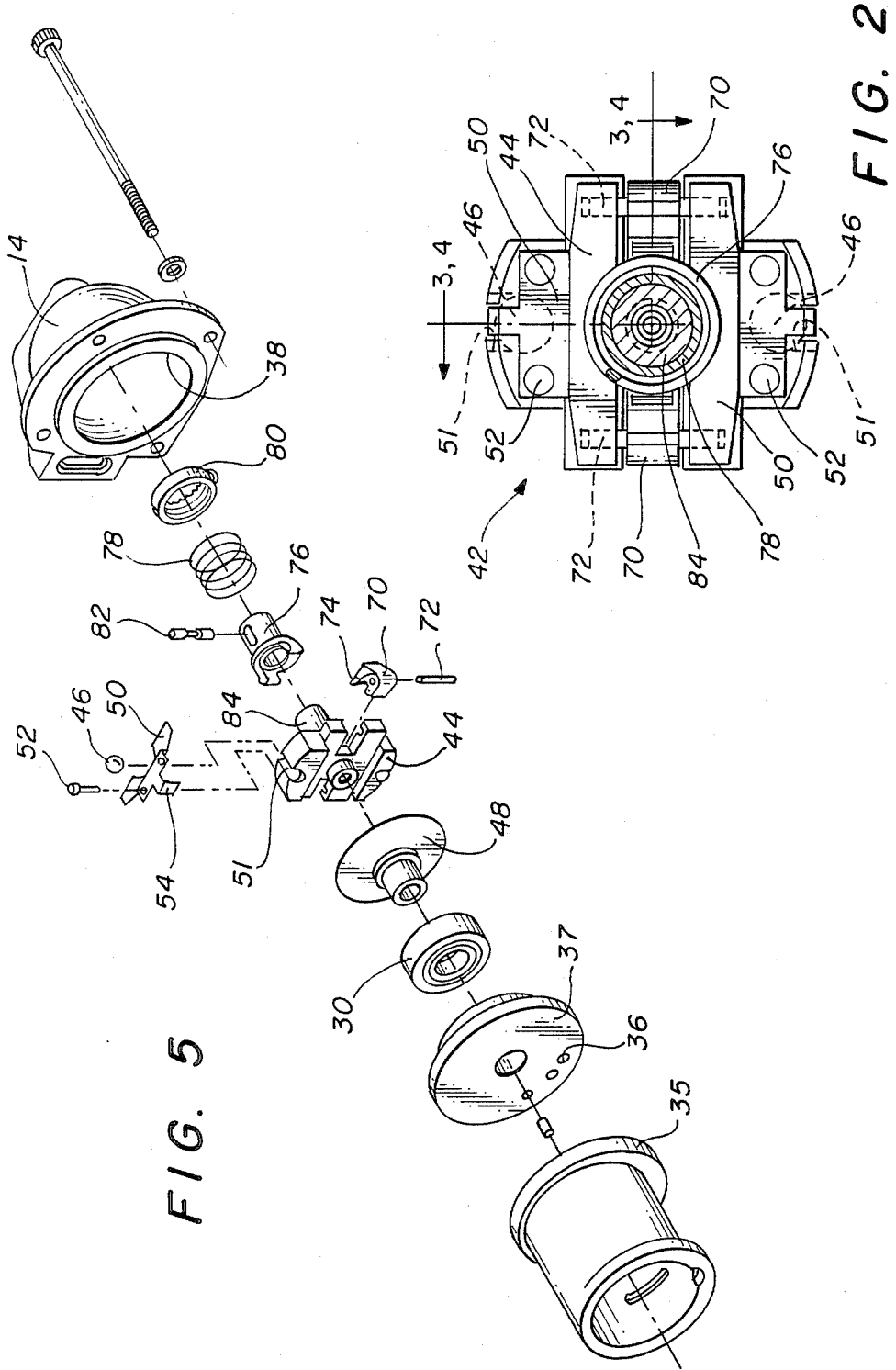
FIG. 2 is a plan view of the mechanism of FIG. 1.

Referring now to FIGS. 1, 2 and 5, over-speed shut-off mechanism 42 includes body 44, balls 46, frusto-conical bistable spring washer 48 and spring members 50. Spring washer 48 is similar to a "Belleville" washer, wherein the outer periphery is in tension such that the washer is bistable. In other words, spring washer 48 will be conical in either one direction or the other, but never flat. Spring washer 48 is shifted between states by forcing it to go over-center. Cylindrical walls 51 are provided to retain balls 46 for outward movement only. Spring members 50 are attached to body 44 by means of rivets 52. Spring members 50 include an arm 54 extending outwardly therefrom to trap ball 46 within body 44, in cooperation with spring washer 48.

Governor mechanism 40 includes weights 70 pivotally mounted to body 44 on pins 72. Weights 70 have fingers 74 for actuation of governor valve 76. Governor spring 78 preloads governor valve 76, and adjustment ring 80 is provided to vary the preload on spring 78. Pin 82 slidably mounts governor valve 76 to shaft 84 of body 44.

Figure 3:
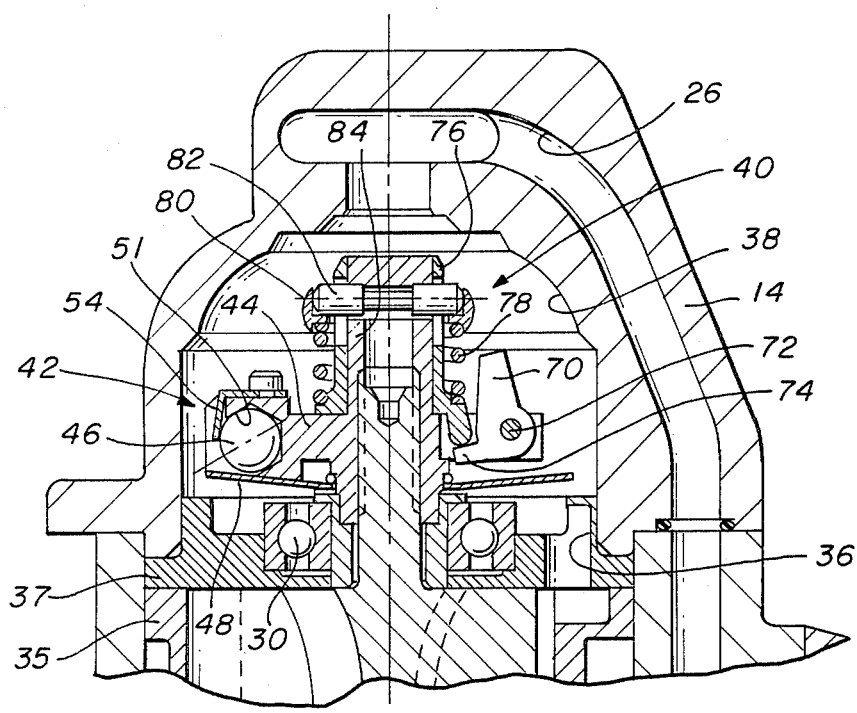
FIG. 3 is a sectional view taken along lines 3—3 of FIG. 2 illustrating the normal operating condition of the mechanism of FIG. 1.
Figure 4:
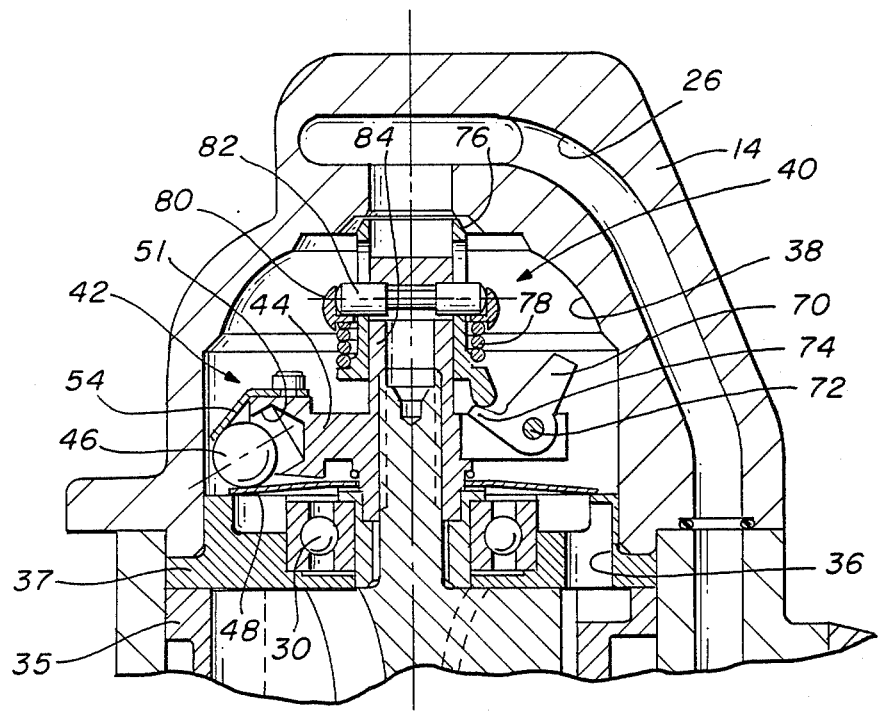
FIG. 4 is a view similar to FIG. 3 illustrating the mechanism of FIG. 1 at the moment of activation.

The operation of the over-speed shut-off mechanism of the present invention is illustrated in FIGS. 3 and 4. It will be understood that FIGS. 3 and 4 are not cross-sectional views, but rather are sectional views taken along right angled lines 3—3 and 4—4 of FIG. 2 in order to show the cooperation of the governor and over-speed shut-off mechanisms.

The normal operating condition, as shown in FIG. 3, is characterized by spring washer 48 being in the upwardly conical state. Compressed gas is free to flow to vanes 34 through passageways 19 and 26, chamber 38 and passageway 36.

Pivoted weights 70 shift governor valve 76 in an upward direction against the bias of spring 78 as the speed of the machine is increased. Speed governing becomes effective when governor valve 76 comes into sufficient proximity with the interior walls of cap 14 to restrict air flow. Governor valve 76 is shown in a highly advanced condition, for example, in FIG. 4.

As the speed of the tool increases, balls 46 are flung outwardly along the axes of cylindrical walls 51 against the combined restraining forces provided by spring washer 48 and spring members 54. At a predetermined over-speed condition, balls 46 are flung sufficiently outwardly to cause spring washer 48 to be in an over-center condition and shift to the concave downwardly position shown in FIG. 4. Compressed gas flow between chamber 38 and passageway 36 is then interrupted by spring washer 48, causing the tool to come to a stop. The tool must then be disassembled for repair of the governor assembly before the spring washer 48 can be reset to the condition shown in FIG. 3.

While only one embodiment has been shown herein and described in connection with the accompanying Drawings, it will be evident to persons skilled in the art that modifications will be possible without departing from the spirit and scope of the following claims

We claim:

1. A rotary pneumatic tool comprising:

a motor having a rotor mounted for rotation about an axis within a stator;

an input opening for connection of the tool to a source of compressed gas;

a plurality of walls defining passageways within the tool between the input opening and the rotor;

a frusto-conical bistable spring washer coaxially mounted with the rotor and having an outer circular edge;

the spring washer being shiftable between two stable configurations: a frusto-conical non-sealing configuration, and an inverted frusto-conical sealing configuration;

the outer circular edge of the spring washer sealingly contacting one of the walls defining the passageways when the spring washer is in the stable sealing configuration, such that communication through the passageways between the source of compressed gas and the rotor is interrupted when the spring washer is in the stable sealing configuration;

a body coaxially mounted for rotation with the rotor; and flyweight means mounted movably in the body for imparting a force upon the spring washer, said force being progressively increased with higher speeds of rotation of the rotor and upon attaining a predetermined amount forcing said washer from the stable nonsealing configuration to the stable sealing configuration for deactivating said tool.

2. The tool of claim 1 wherein the means for imparting a force comprises an element restrained for outward movement by the body and the spring washer.

3. The tool of claim 2 wherein the means for imparting a force includes cylindrical walls within the body and at least one spherical element partially retained by the cylindrical walls and contacting the spring washer when the spring washer is in the nonsealing position.

4. The tool of claim 3 further comprising a deflectable spring member restraining said spherical element from outward movement, such that the spring washer shifts from the non-sealing to the sealing position at an angular velocity predetermined by the combined spring rates of the spring washer and spring member.

5. The tool of claim 4 wherein the spring member is attached to the body and includes an arm extending from the body and contacting the spherical element.

* * * * *